(12) United States Patent
Menjak et al.

(10) Patent No.: US 7,635,149 B2
(45) Date of Patent: Dec. 22, 2009

(54) ROCKER-ARM LOCK DEVICE OF AN ADJUSTABLE STEERING COLUMN ASSEMBLY

(75) Inventors: Damir Menjak, Frankenmuth, MI (US); Allan L. Dickinson, Flushing, MI (US); Melvin L. Tinnin, Clio, MI (US); Troy Daenzer, Reese, MI (US); William D. Cymbal, Freeland, MI (US); Stephen E. Koehr, Birch Run, MI (US); Michael P. Anspaugh, Bay City, MI (US); Neal R. Roller, Essexville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 249 days.

(21) Appl. No.: 11/726,209

(22) Filed: Mar. 21, 2007

(65) Prior Publication Data

US 2008/0231030 A1    Sep. 25, 2008

(51) Int. Cl.
*B62D 1/184* (2006.01)
(52) U.S. Cl. .......................... 280/775; 74/493
(58) Field of Classification Search ............... 74/493; 280/775; B62D 1/184
See application file for complete search history.

(56) References Cited

U.S. PATENT DOCUMENTS

| | | | |
|---|---|---|---|
| 4,472,982 A | | 9/1984 | Nishikawa |
| 4,541,298 A | * | 9/1985 | Strutt ........................... 74/493 |
| 4,732,050 A | * | 3/1988 | Vollmer ........................ 74/493 |
| 4,793,204 A | | 12/1988 | Kubasiak |
| 5,161,425 A | * | 11/1992 | Baskett et al. ................. 74/493 |
| 5,588,337 A | | 12/1996 | Milton |
| 5,722,299 A | * | 3/1998 | Yamamoto et al. ............. 74/493 |
| 5,787,759 A | * | 8/1998 | Olgren ......................... 74/493 |
| 6,092,957 A | * | 7/2000 | Fevre et al. .................. 403/373 |
| 6,237,439 B1 | | 5/2001 | Weber et al. |
| 6,390,717 B1 | * | 5/2002 | Bar ............................ 403/104 |
| 6,419,269 B1 | * | 7/2002 | Manwaring et al. .......... 280/775 |
| 6,481,310 B2 | | 11/2002 | Janeczko et al. |
| 6,540,429 B2 | | 4/2003 | Weisgerber et al. |
| 6,616,185 B2 | | 9/2003 | Manwaring et al. |
| 6,659,504 B2 | | 12/2003 | Manwaring et al. |

(Continued)

*Primary Examiner*—Faye M. Fleming
*Assistant Examiner*—Laura Freedman
(74) *Attorney, Agent, or Firm*—Cantor Colburn LLP

(57) ABSTRACT

A steering column assembly of a vehicle has a rocker-arm lock device for locking an adjustable steering housing and co-extending steering shaft to a stationary bracket or chassis. For driver convenience and comfort, the steering housing and shaft are together adjustable with respect to the bracket. The rocker-arm lock device has a slot in at least one of the housing and bracket and a carrier for longitudinal movement through the slot that is substantially perpendicular to a rotation axis of the steering shaft. An indexing apparatus of the device has first and second indexing rails carried by at least one of the housing and the bracket having the first slot and a carriage engaged rigidly to the carrier. A rocker arm of the apparatus is supported pivotally to the carriage about a rocker axis disposed substantially perpendicular to the carrier. The rocker arm carries first and second pads spaced diametrically outward from one another with respect to the rocker axis and facing laterally toward respective first and second indexing rails for selective engagement of at least one of the first and second pads to the respective first and second indexing rails.

23 Claims, 12 Drawing Sheets

U.S. PATENT DOCUMENTS

| | | |
|---|---|---|
| 6,695,350 B2 | 2/2004 | Uphaus et al. |
| 6,729,007 B2 | 5/2004 | Weisberger et al. |
| 6,857,660 B2 | 2/2005 | Manwaring et al. |
| 6,863,306 B2 | 3/2005 | Bechtel et al. |
| 7,093,855 B2 | 8/2006 | Manwaring et al. |
| 7,150,204 B2 * | 12/2006 | Uphaus et al. ................ 74/493 |
| 7,484,430 B2 * | 2/2009 | Schulz ........................ 74/493 |
| 2002/0027355 A1 * | 3/2002 | Bohlen et al. ................ 280/775 |
| 2004/0035238 A1 * | 2/2004 | Jolley et al. .................... 74/493 |
| 2006/0021460 A1 * | 2/2006 | Schulz ........................ 74/493 |
| 2008/0060467 A1 * | 3/2008 | Manwaring et al. ........... 74/493 |
| 2008/0178702 A1 * | 7/2008 | Lutz ............................ 74/493 |
| 2008/0229865 A1 * | 9/2008 | Manwaring et al. ........... 74/493 |
| 2008/0231031 A1 * | 9/2008 | Manwaring et al. ......... 280/775 |

* cited by examiner

ROCKER-ARM LOCK DEVICE OF AN ADJUSTABLE STEERING COLUMN ASSEMBLY

FIELD OF THE INVENTION

The present invention relates to an adjustable steering column assembly for a vehicle, and more particularly to a rocker-arm lock device of the adjustable steering column assembly having at least one indexing apparatus.

BACKGROUND OF THE INVENTION

Known adjustable steering column assemblies can be adjusted in a longitudinal or telescoping direction and in a tilt direction. Generally the longitudinal direction moves a steering wheel forward and rearward with respect to the vehicle and thus farther or closer to the driver. The tilt direction generally moves and tilts the steering wheel in a vertical direction, thus closer or further away from a lap of the driver. To adjust the steering column assembly, the driver must first unlock a lock device before the steering column assembly will move. In some known assemblies, the tilt adjustment and the telescoping adjustment features each have its own lock device. In other known assemblies, a single lock device will release the assembly for both adjustments.

Unfortunately, the actuating levers of known lock devices are typically located on either the left or right hand sides of the steering column and actuated via a pivoting movement. This orientation and the required pivoting action limit packaging ability of the assembly and can restrict comfort and convenience for the driver. Moreover, known levers are typically mounted to a stationary bracket of the assembly and thus do not move with the steering wheel. Thus, relative to the steering wheel, the position of the lever changes and may not be ideally positioned through the adjustment range of the assembly.

SUMMARY OF THE INVENTION

A steering column assembly of a vehicle has a rocker-arm lock device for locking an adjustable steering housing and co-extending steering shaft to a stationary bracket or chassis. For driver convenience and comfort, the steering housing and shaft are together adjustable with respect to the bracket. The rocker-arm lock device has a slot in at least one of the housing and the bracket, and a carrier for longitudinal movement through the slot that is substantially perpendicular to a rotation axis of the steering shaft. An indexing apparatus of the device has first and second indexing rails carried by the housing and/or the bracket having the slot, and a carriage engaged rigidly to the carrier. A rocker arm of the apparatus is supported pivotally to the carriage about a rocker axis disposed substantially perpendicular to the carrier. The rocker arm carries first and second pads spaced diametrically outward from one another with respect to the rocker axis and facing laterally toward respective first and second indexing rails for selective engagement of at least one of the first and second pads to the respective first and second indexing rails.

Objects, features and advantages of the present invention include an adjustable steering column assembly having a rocker-arm lock device that utilizes an indexing apparatus compatible with a centrally orientated actuator lever. Moreover, use of the indexing apparatus is compatible with both longitudinal and tilt adjustment of the steering column and because the apparatus is biased toward an unlocked position of the device, the apparatus prevents the need for a driver to hold a lever while simultaneously adjusting the steering column. Other advantages include an apparatus that contributes toward smooth operation and one that will not bind, and an apparatus that is relatively simple in design, robust, requires no maintenance and has a long and useful life.

DESCRIPTION OF THE DRAWINGS

These and other objects, features and advantages of this invention will be apparent from the following detailed description, appended claims, and accompanying drawings in which:

DETAILED DESCRIPTION OF THE PREFERRED EMBODIMENTS

Figure 1:
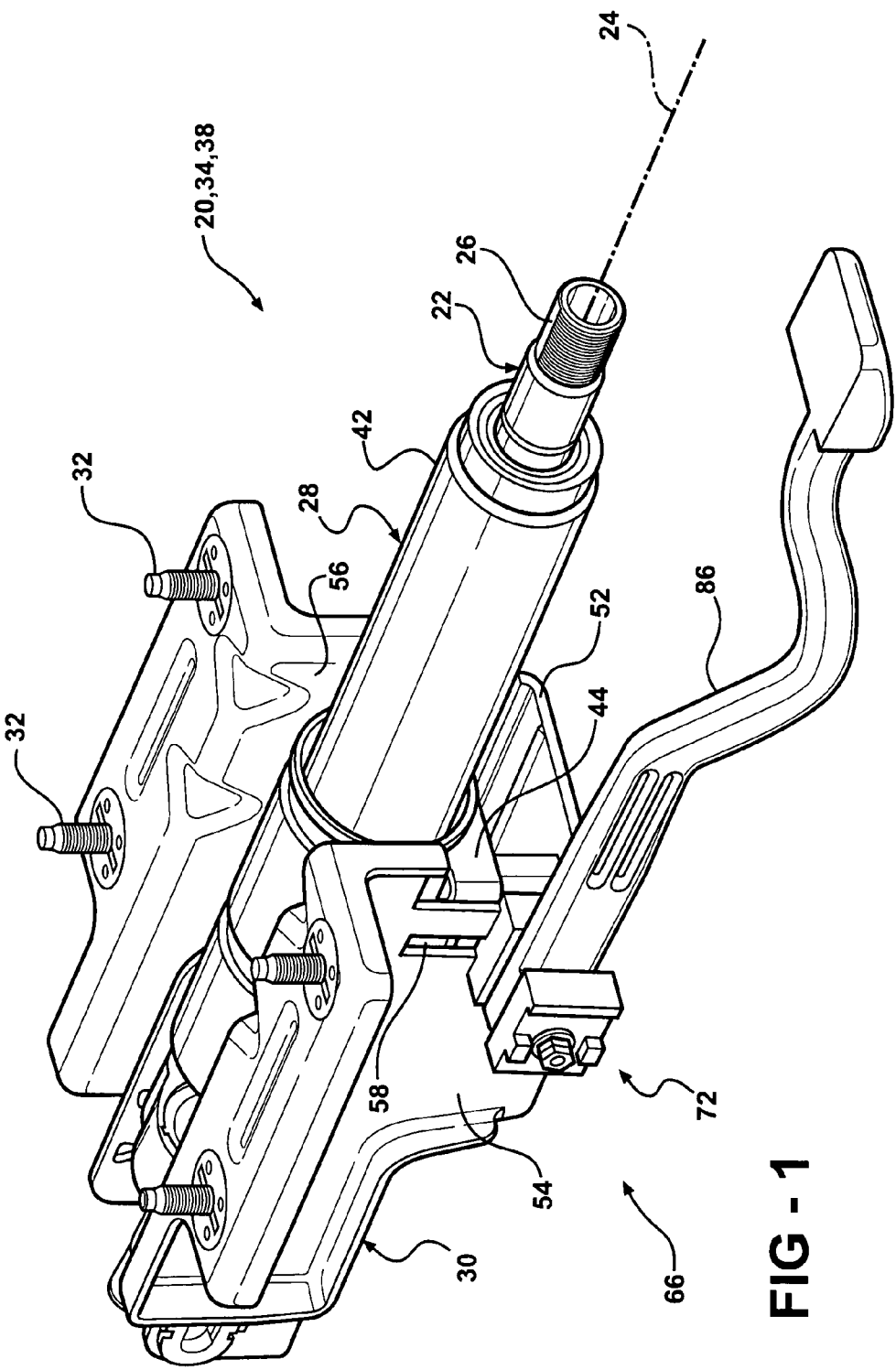
FIG. 1 is a perspective view of an adjustable steering column assembly of the present invention illustrated in a tilt down state and retracted position.

Referring now to FIG. 1 of the drawings, an adjustable steering column assembly 20 for a vehicle has a steering shaft 22 that projects rearward with respect to the vehicle and along a rotation axis 24 to a distal end 26 that attaches to a steering wheel (not shown). The steering shaft 22 is preferably journaled to and rotates within a tilt housing or steering column 28. The housing 28 is support by a bracket 30 of the assembly 20 that engages rigidly to a chassis of the vehicle via a plurality of sheer pins 32 that project preferably upward from the bracket 30 to engage the chassis. The pins 32 are preferably constructed and arranged to shear or break away from the chassis should the driver forcibly impact the steering wheel during a vehicle collision.

Figure 2:
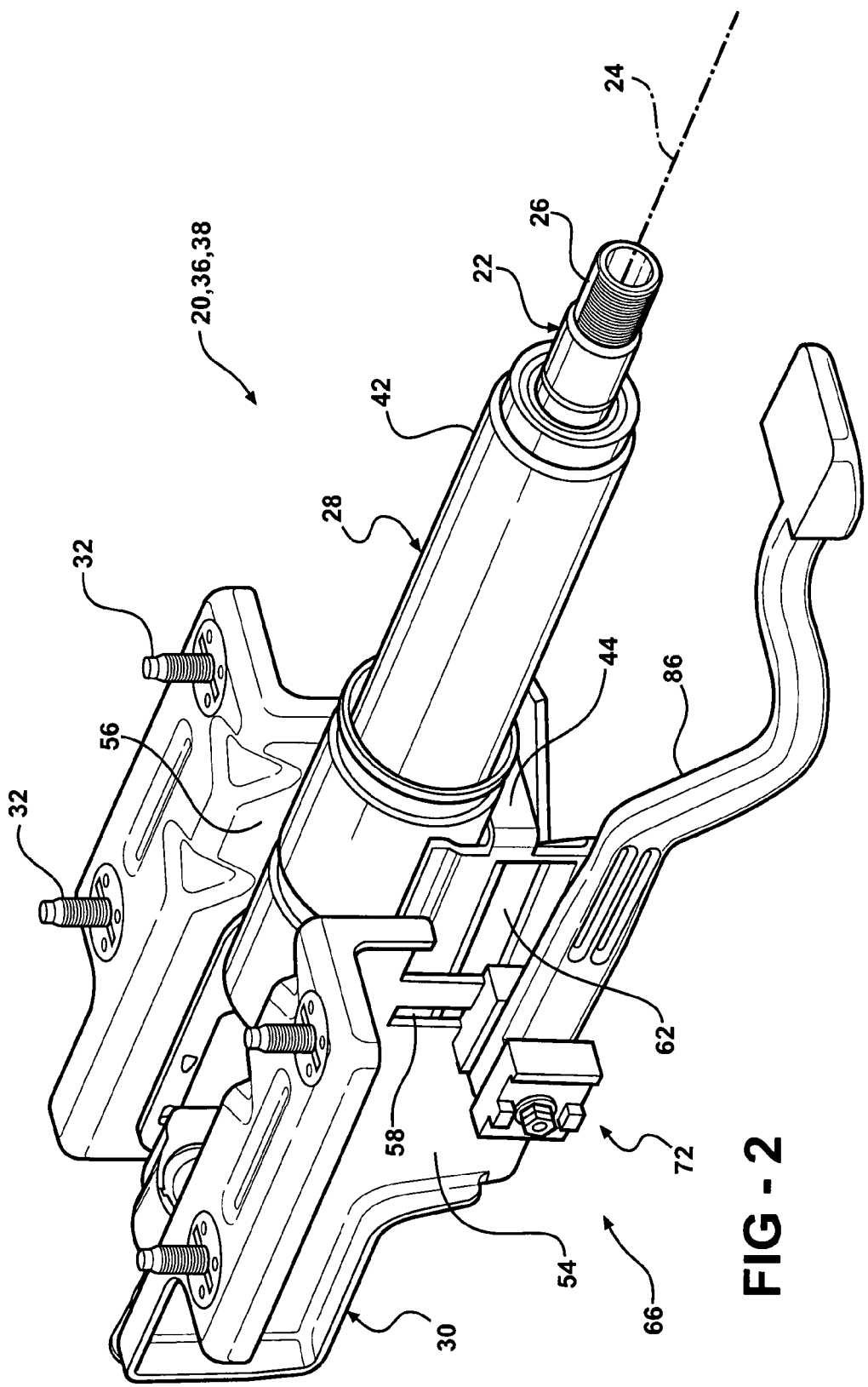
FIG. 2 is a perspective view of the adjustable steering column assembly illustrated in a tilt down state and extended position.

The housing 28 and co-extending shaft 22 are preferably constructed and arranged to extend and retract longitudinally as a single unit and with respect to the bracket 30 between a retracted position 34 (see FIG. 1) and an extended position 36 (see FIG. 2). When extending, the housing 28 and shaft 22 move in a linear rearward direction with respect to the vehicle, and when retracting, the housing 28 and shaft 22 move in a forward direction and generally into the bracket 30.

Figure 3:
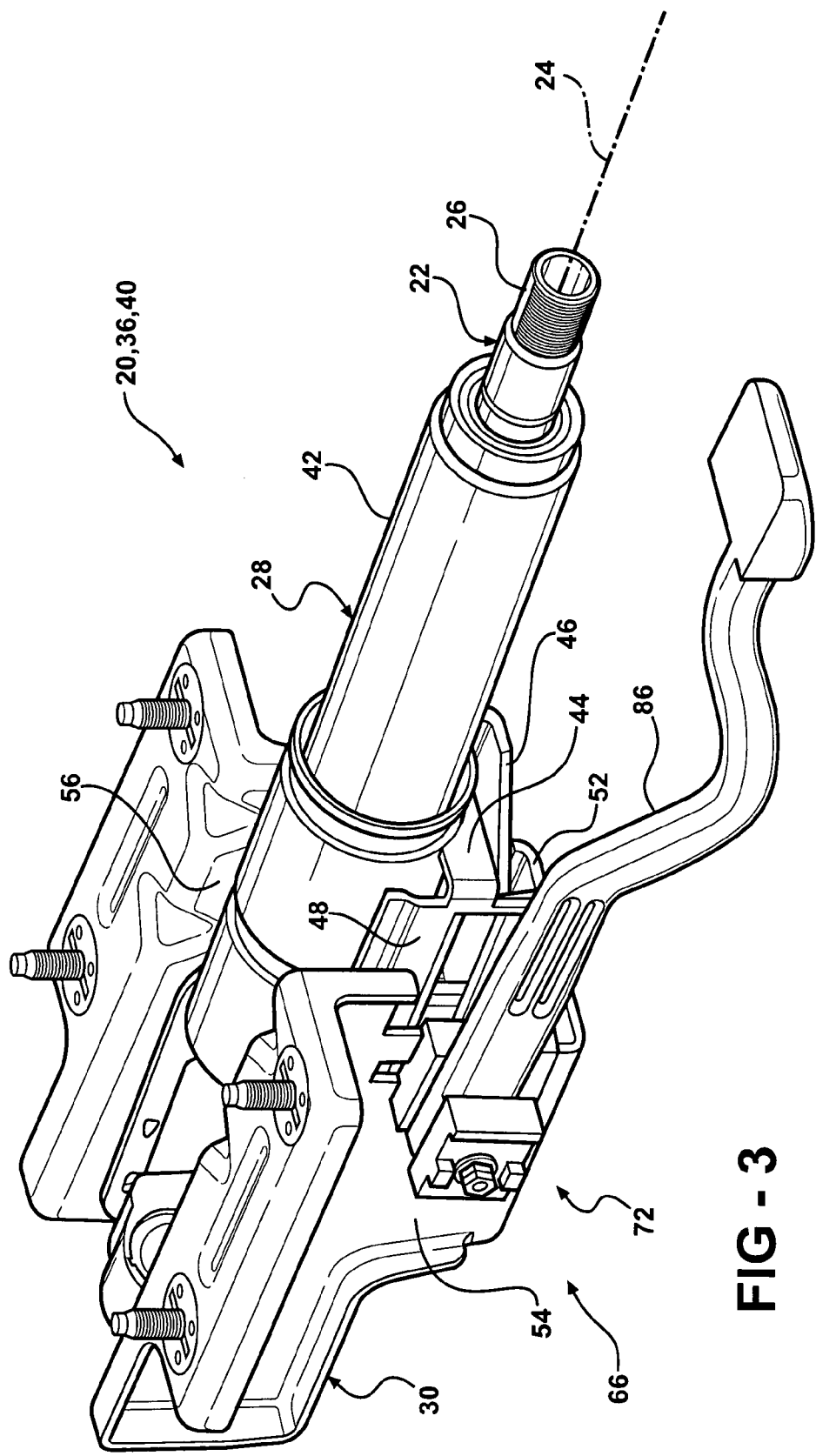
FIG. 3 is a perspective view of the adjustable steering column assembly illustrated in a tilt up state and extended position.

This forward and rearward movement, however, is not necessarily parallel to rotation axis 24 of steering shaft 22 because the housing 28 and shaft 22 are preferably constructed and arranged to tilt as a single unit between a rake or tilt down state 38 (see FIG. 1) and a rake or tilt up state 40 (see FIG. 3). This tilt adjustment moves the distal end 26 of the steering shaft 22 in an arcuate and substantially vertical direction. To accommodate drivers of small stature, the housing 28 is generally extended near the extended position 36 and tilt down state 38. To comfortably accommodate drivers of larger stature, the housing 28 is generally retracted to near the retracted position 34 and the tilt up state 40.

Figure 4:
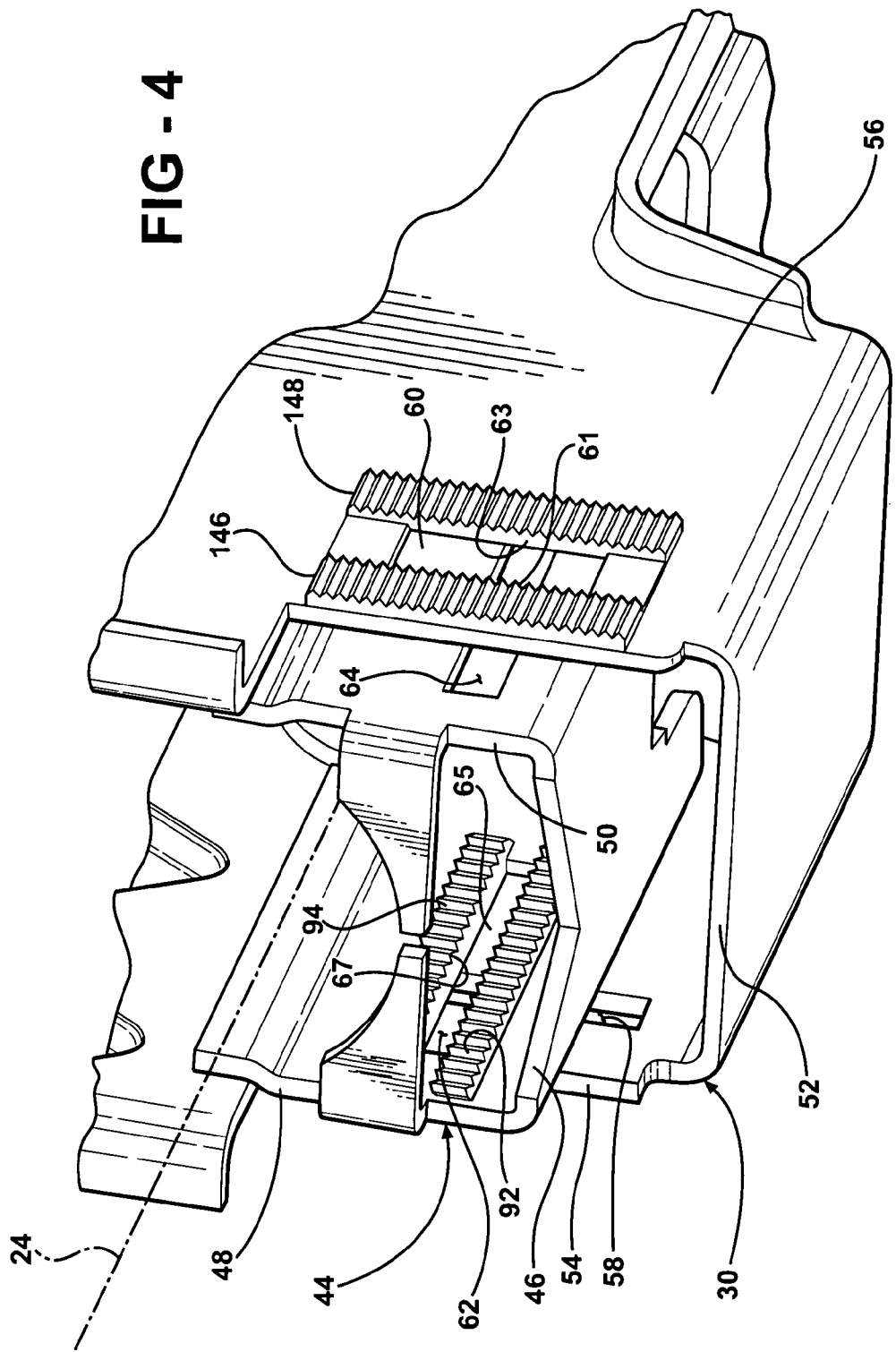
FIG. 4 is a perspective view of a shuttle portion and a bracket of the assembly with other parts removed to show internal detail.
Figure 5:
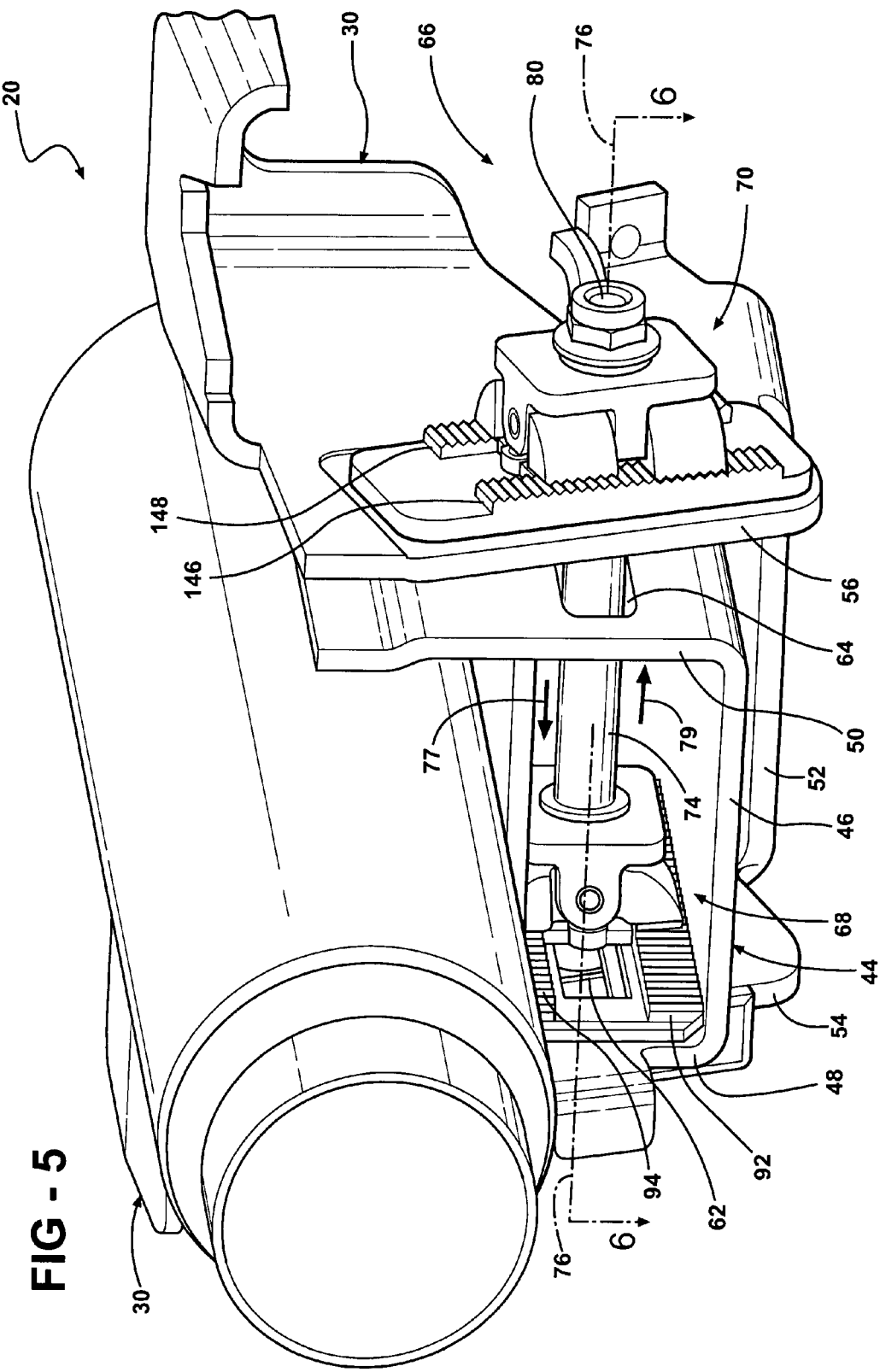
FIG. 5 is a partial perspective view of the steering column assembly illustrating longitudinal and tilt indexing apparatuses of a rocker-arm lock device of the assembly.

As best illustrated in FIGS. 1 and 4, the housing 28 has a substantially tubular portion 42 that surrounds and rotatably supports the rotating steering shaft 22, and a support shuttle portion 44 that projects downward from the tubular portion 42. The shuttle portion 44 is at least in-part located in the bracket 30 and is supported operably by the bracket. The shuttle portion 44 has a cross section that generally forms an upright U-shape having a bottom wall 46 and two opposite sidewalls 48, 50 that project upward from the bottom wall 46 to rigidly connect to the tubular portion 42. Correspondingly and as best shown in FIG. 5, the bracket 30 has a bottom panel 52 located immediately beneath the bottom wall 46 of the shuttle portion 44 and two opposite side panels 54, 56 projecting upward from the base panel 52 to preferably engage the vehicle chassis via the pins 32. With respect to axis 24, the side panels 54, 56 are located immediately outward from the respective sidewalls 48, 50 of the shuttle portion 44. Preferably, the sidewalls 48, 50 and side panels 54, 56 span substantially vertically and are substantially parallel to one another.

A substantially vertical first slot 58 is located in the first side panel 54 of the bracket 30 and a substantially vertical second slot 60 is located in the second side panel 56 of the bracket 30, both slots 58, 60 enable tilting movement of the housing 28 between the tilt down and tilt up states 38, 40. The second slot 60 is defined by opposing longitudinal sides 61, 63 carried by the side panel 56. Preferably, the first side panel 54 that defines the first slot 58 is generally smooth and the second side panel 56 adjacent the second slot 60 and normal to opposing sides 61, 63 is raked or indexed for selection of a tilt position. For telescoping or longitudinal movement of the assembly 20 between the retracted and extended positions 34, 36, a substantially horizontal third slot 62 is in the first sidewall 48 and generally crosses or communicates laterally with the first slot 58, and a substantially horizontal fourth slot 64 is in the second sidewall 50 and generally crosses or communicates laterally with the second slot 60. The third slot 62 is defined by opposing longitudinal sides 65, 67 carried by the sidewall 48. Preferably, the second sidewall 50 that defines the fourth slot 64 is generally smooth and the first sidewall 48 adjacent the third slot 62 and normal to opposing sides 65, 67 is indexed for selection of a longitudinal or extended/retracted position of the assembly 20.

Referring to FIGS. 1, 4 and 5, the assembly 20 has a rocker-arm lock device 66 that has a first indexing apparatus 68 for adjusting and locking the longitudinal position of the assembly 20, preferably a second indexing apparatus 70 for adjusting and locking the tilt state of the assembly 20, an actuator 72, and a linking carrier or rod 74 that operably links both indexing apparatuses 68, 70 to the common actuator 72. The elongated carrier 74 extends through all four slots 58, 62, 64, 60 along a first centerline 76 that is substantially perpendicular to the axis 24 and preferably spaced below the steering shaft 22 and tubular portion 42 of the housing 28. The actuator 72 engages a first end 78 of the carrier 74 located outward from the first side panel 54 of the bracket 30. The carrier 74 generally carries at least in part the first indexing apparatus 68 at a location between the first and second sidewalls 48, 50 of the shuttle portion 44, and an opposite second end 80 of the carrier 74 connects and carries at least in part the second indexing apparatus 70 and at a location outward from the second side panel 56 of the bracket 30.

Figure 6:
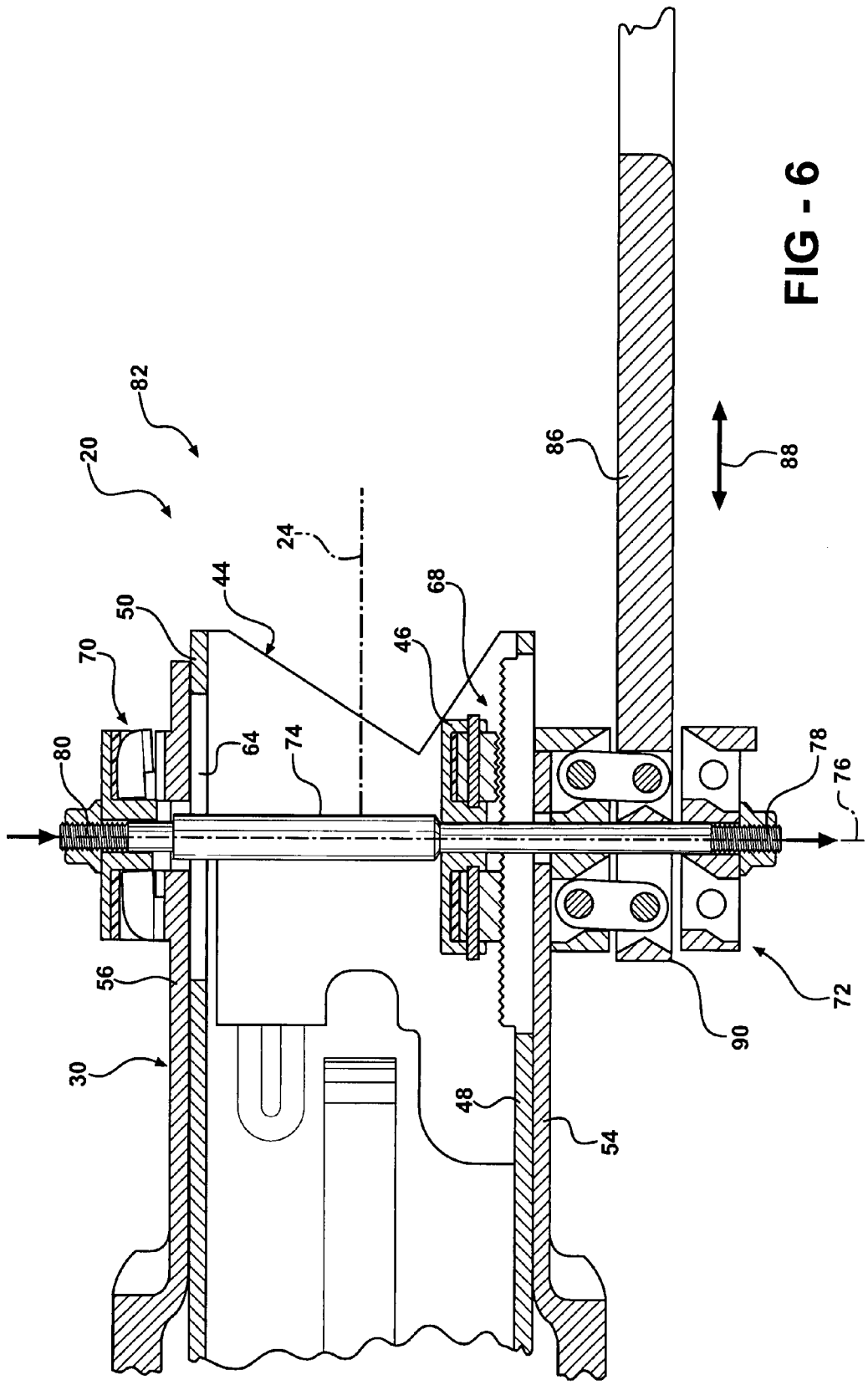
FIG. 6 is a cross section of the steering column assembly illustrated in a locked position and taken along line 6-6 of FIG. 5.
Figure 7:
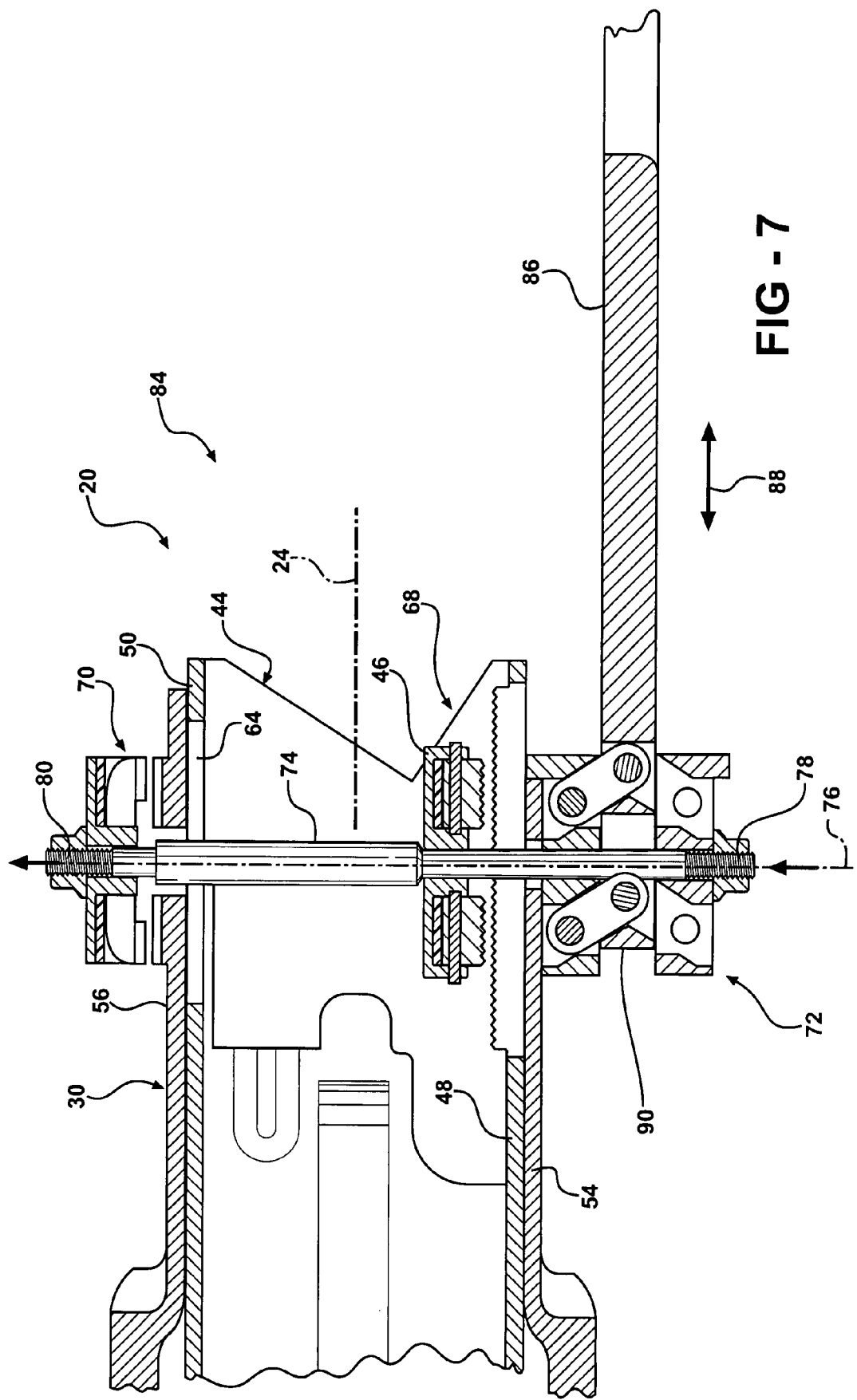
FIG. 7 is a cross section of the steering column assembly similar in perspective to FIG. 6 except illustrated in an unlocked position.

The actuator 72 may be any variety of lock device actuators capable of moving the carrier 74 along the first centerline 76 and in a first direction 77 to place the device 66 in a locked position 82 and in an opposite second direction 79 to place the device 66 in an unlocked position 84. When in the locked position 82, the first end 78 of the carrier 74 is distant from the first side panel 54 of the bracket 30 (see FIG. 6), and when in the unlocked position 84, the first end 78 is closer to or in the proximity of the first side panel 54 (see FIG. 7). One such actuator 72 is taught in U.S. patent application Ser. No. 11/726,216 (U.S. Publ. No. 2008-0231031-A1), titled: RELEASABLE PUSH/PULL LOCK DEVICE OF AN ADJUSTABLE STEERING COLUMN ASSEMBLY, filed on the same day as the present invention with a common assignee, and incorporated herein by reference in its entirety. Another such actuator 72 is taught in U.S. patent application Ser. No. 11/726,207 (U.S. Publ. No. 2008-0229865-A1), titled: CENTRAL LOCK DEVICE OF AN ADJUSTABLE STEERING COLUMN ASSEMBLY, filed on the same day as the present invention with a common assignee, and incorporated herein by reference in its entirety.

In the preferred embodiments of the actuator 72, the actuator has a lever 86 that may project in a rearward direction 88 with respect to the vehicle and toward the driver. The lever 86 may be manually actuated in a linear direction preferably along its length and substantially parallel to direction 88. Furthermore, the lever 86 generally remains substantially parallel to axis 24 regardless of longitudinal positions 34, 36 and regardless of states 38, 40. Because movement and projection of the lever 86 is substantially parallel to axis 24, the lever 86 is generally central to the assembly 20 as oppose to known levers that project radially with respect to a steering shaft and that generally pivot in an imaginary plane that traverses the steering axis.

Yet in another preferred embodiment, the lever 86 may be actuated manually via rotation about centerline 76 wherein a cam or geared relationship exists generally between a base end 90 of the lever 86 and the first end 78 of the carrier 74. Regardless of whether the lever 86 is actuated linearly or rotatably, manual movement of the lever from the unlocked position 84 and toward the locked position 82 acts against an axial biasing force generally exerted by the indexing apparatuses 68, 70 and with respect to centerline 76.

Referring to FIGS. 1, 4, 5 and 8 and more specific to the present invention, the longitudinal indexing apparatus 68 and the tilt indexing apparatus 70 are substantially the same except that one is offset by about ninety degrees about the centerline 76 and with respect to the other. This angular offset corresponds with the respective slots 62, 60. The longitudinal indexing apparatus 68 has a pair of rails 92, 94 carried by a plate that is supported by the sidewall 48 of the shuttle portion 44 and generally facing away from the first end 78 of the carrier 74. The rails 92, 94 are located adjacent and normal to respective sides 65, 67. Each rail 92, 94 preferably has a plurality of ribs or teeth 96 spaced laterally apart from one another along the rail. Each tooth 96 is substantially disposed perpendicular to the adjacent slot or respective sides 65, 67. Preferably, each tooth 96 has a pointed apex 98, and adjacent teeth are laterally spaced by a valley 100 with an acute angled bottom defined by the sidewall 48. One skilled in the art would now know that the plate carrying the rails 92, 94 may be separate from the sidewall 48. Moreover, the slot 62 may actually be in the plate that is in-turn supported rigidly by the sidewall 48 of the shuttle portion 44. Alternatively, the rails 92, 94 may be imprinted directly into the sidewall 48 alleviating the need for an additional part (i.e. the plate). For the sake of further explanation the plate is considered to be a part of the sidewall 48.

Figure 8:
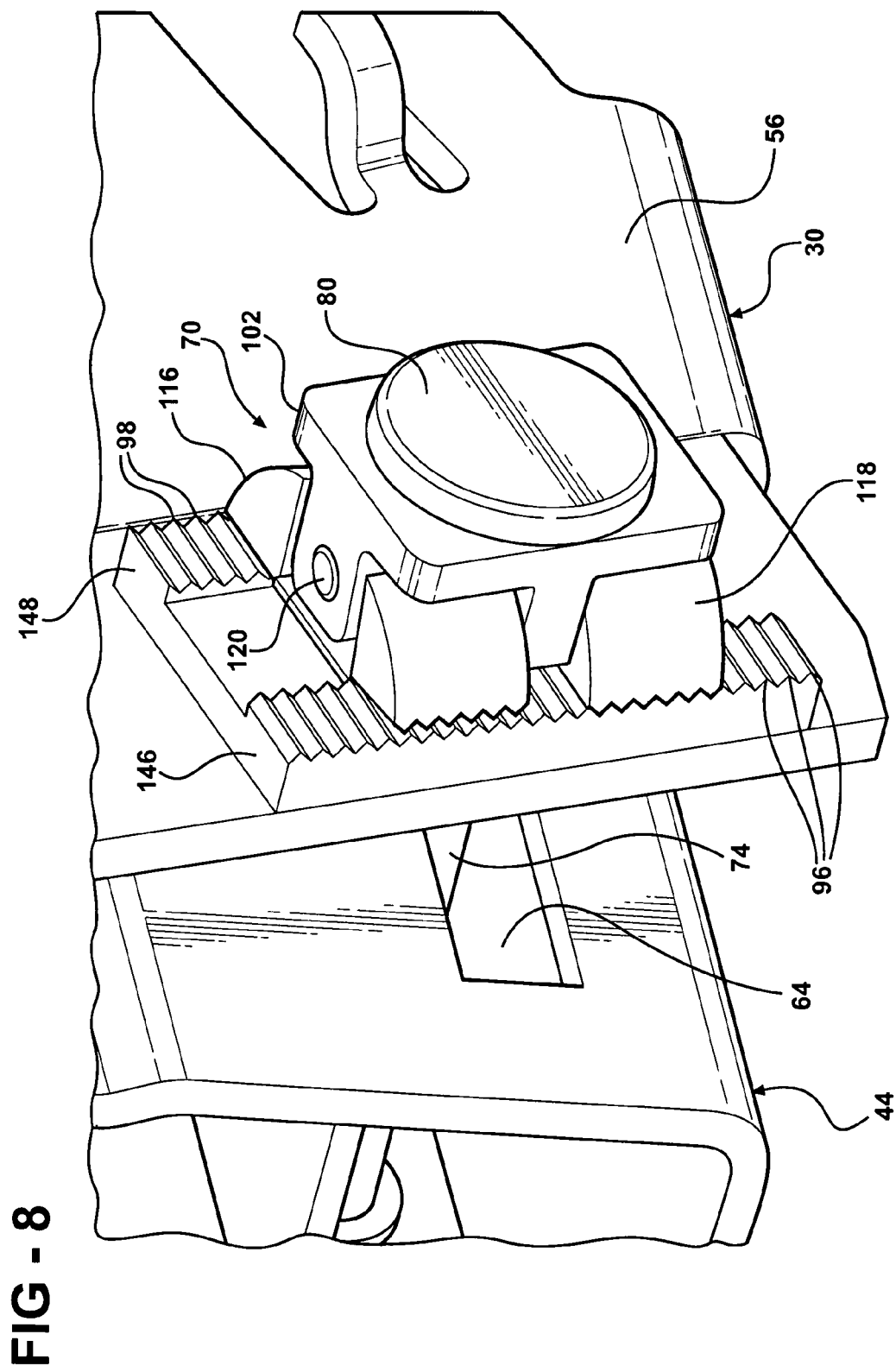
FIG. 8 is a perspective view of the tilt indexing apparatus.
Figure 9:
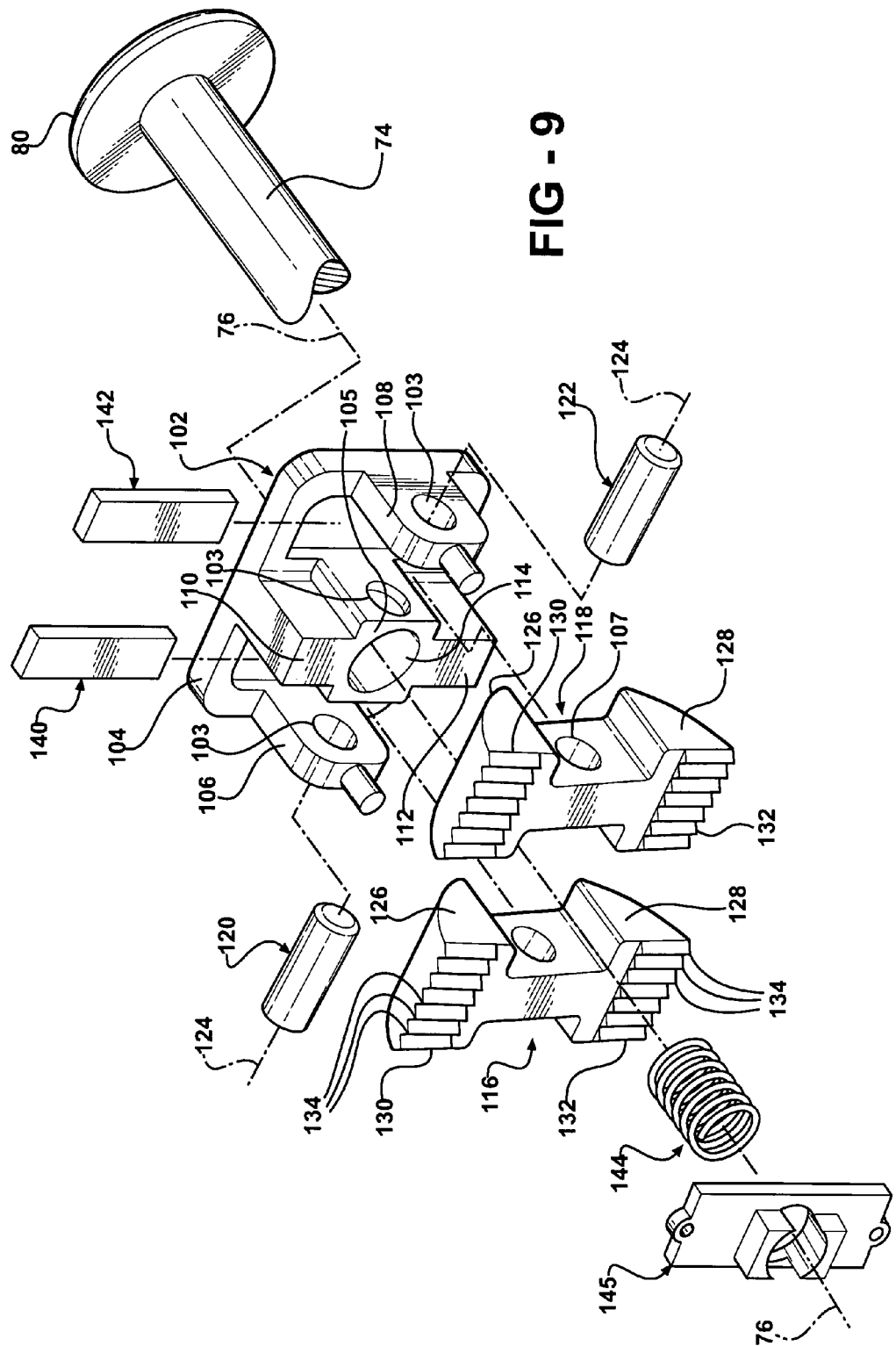
FIG. 9 is an exploded perspective view of the tilt indexing apparatus.

As best shown in FIGS. 8-9, opposing the rails 92, 94 is a carriage 102 of the apparatus 68 engaged rigidly and substantially centered to the carrier 74. Carriage 102 has a substantially planar and square base 104, a collar 105, two support legs 106, 108 and two spacers 110, 112. The base 104 is orientated substantially perpendicular to the centerline 76. The collar 105, legs 106, 108 and spacers 110, 112 project axially with respect to centerline 76 from the base 104 and generally toward the rails 92, 94. For assembly purposes, the carrier 74 inserts through a bore 114 disposed concentrically to centerline 76 and communicating through the base 104 and the collar 115. The legs 106, 108 are opposed diametrically to one another with respect to the bore 114 and spaced radially outward from the collar 115. The spacers 110, 112 are diametrically opposed to one another with respect to the bore 114 and generally project radially outward from the collar 115 in opposite directions.

Elongated first and second rocker arms 116, 118 of the indexing apparatus 68 are generally located between the collar 115 and respective legs 106, 108. The rocker arms 116, 118 are substantially parallel to one another and extend perpendicular to the respective rails 92, 94. Each rocker arm 116, 118 is supported pivotally at mid-length by a respective pin 120, 122 for rocking about a common rocker axis 124 located substantially perpendicular to centerline 76 and parallel to slot 62 in the shuttle portion 44. Each pin 120, 122 is press fitted at one end into holes 103 in the respective legs 106, 110 and at the other end into holes 103 in the collar 105 of the carriage 102 and rotatably through holes 107 centered in respective rocker arms 116, 118 (see FIG. 9). Both rocker arms 116, 118 pivot independently about respective pins 120, 122. One skilled in the art would now know that the pins 120, 122 may be one pin and the holes 103 may also communicate transversely through the carrier 74. In this way, the common pin can also function to secure the carriage 102 directly to the carrier 74.

Each rocker arm 116, 118 has first and second wings 126, 128 that generally project in diametrically opposite directions with respect to rocker axis 124. Indexing pads 130, 132 are generally carried by respective distal ends of the wings 126, 128. The pads 130, 132 generally face toward the respective rails 92, 94 for selective engagement thereto. Each pad 130, 132 preferably carries and defines a plurality of teeth 134 that selectively mate with the conforming valleys 100 in the respective rails 92, 94.

Preferably, when the lock device 66 is in the locked position 82 only one pad 130, 132 of each rocker arm 116, 118 is fully mated to a respective rail 92, 94 such that the rocker arms 116, 118 are generally counter to one another. This counter arrangement provides symmetry and the even distribution of engagement forces internal to the device 66 for smooth and reliable operation. More specifically, the first pad 130 of the first rocker arm 116 may be indexed to or mated with the first rail 92 while the second pad 132 of the first rocker arm 116 is not mated to the second rail 94, and the second pad 132 of the second rocker arm 118 is indexed to or mated with the second rail 94 while the first pad 130 of the second rocker arm 118 is not mated to the first rail 92. Alternatively and generally by chance, the second pad 132 of the first rocker arm 116 may be mated with the second rail 94, and the first pad 130 of the second rocker arm 118 may be mated to the first rail 92.

To assure that only one pad 130, 132 of any one rocker arm 116, 118 is mated to the respective rail 92, 94 at any one time, the teeth 96 of the first rail 92 are aligned to the valleys 100 of the second rail 94 (i.e. the teeth 96 of the first rail 92 are misaligned to the teeth 96 of the second rail 94 by the width of half a tooth). With this rail tooth arrangement, the teeth 134 of the first pads 130 of the rocker arms 116, 118 are aligned to the teeth 134 of the second pads 132. One skilled in the art would now know that the teeth 96 between the first and second rails 92, 94 may be aligned if the teeth 134 between the first and second pads 130, 132 are misaligned.

Figure 10:
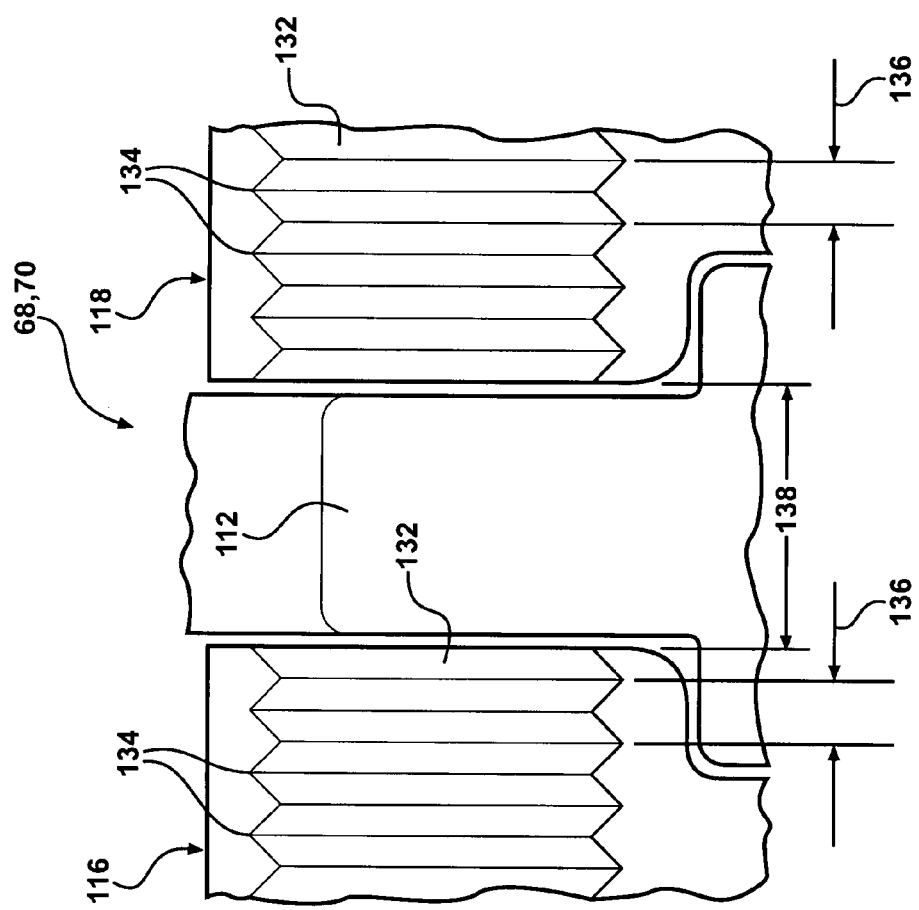
FIG. 10 is a partial perspective view of an underside of the tilt indexing apparatus illustrating an arrangement of teeth between a pair of rocker arms.

To assure the rocker arms 116, 118 are counter rotated to one another when the lock device 66 is in the locked position 82, each elongated tooth 134 of the pads 130, 132 has a lateral width of 136 (as best shown in FIG. 10). Associated with or a function of the width 136 is the lateral width 138 (i.e. extending tangentially with respect to carrier 74) of the spacers 110, 112, which is generally any summed number of the tooth widths 136 plus one half the distance of one tooth width 136 (i.e. the width of any number of teeth plus one half the width of one tooth). This offset of teeth 134 between common pads 130, and again between common pads 132 of the rocker arms 116, 118 prevents the indexing or locking of both pad 130 of arm 116 and pad 130 of arm 118, and the locking of both pad 132 of arm 116 and pad 132 of arm 118 at any given time. Consequently, when the lock device 66 is in the locked position 82 one pad 130 and one pad 132 is indexed or mated.

Resiliently compressible or spring-like compression members 140, 142 of the apparatus 68 are located to exert a biasing force axially between the base and the respective rocker arms 116, 118 with respect to the centerline 76, and are disposed generally between the collar 105 and respective legs 106, 108. When the indexing apparatus 68 of the lock device 66 moves from the locked position 82 (see FIG. 6) and toward the unlocked position 84, the members 140, 142 function to pivot the respective arms 116, 118 toward a common parallel orientation with the base 104 of the carriage 102 and preferably a perpendicular orientation with the centerline 76. In this way, the pads 130, 132 of both rocker arms 116, 118 are best positioned to clear the teeth 96 of the respective rails 92, 94. Preferably, the compression members 140, 142 are made of a urethane material, however, one skilled in the art would now know that the members 140, 142 can be made of any material that is resiliently compressible or may have characteristics of a mechanical device such as a leaf spring or multiple coiled springs.

Preferably, a coiled compression spring 144 of the longitudinal indexing apparatus 68 is located concentrically about the carrier 74 and centerline 76, and is resiliently compressed axially between the collar 105 of the carriage 102 and a sliding guide plate 145 that is supported slidably by the wall 48 of the shuttle portion 44 and between rails 92, 94. The spring 144 exerts an axial force with respect to centerline 76 that biases the lock device 66 toward the unlocked position 84 and acts to generally hold the components of the lock device 66 in proper operating orientation to one another. For instance, the spring 144 acts to hold the actuator 72 against and in a sliding relationship to the side panel 54 of the bracket 30.

Like the longitudinal indexing apparatus 68, the tilt indexing apparatus 70 has a pair of rails 146, 148. In contrast to the rails 92, 94 of the longitudinal indexing apparatus 68, the rails 146, 148 of the tilt indexing apparatus 70 are carried by a plate supported by and of the side panel 56 of the bracket 30. The rails 146, 148 are located adjacent and normal to respective sides 61, 63 that define slot 60. Preferably, all other aspects and components of the tilt indexing apparatus 70 is the same as the longitudinal indexing apparatus 68. For instance, apparatus 70 preferably has a coiled compression spring 144 located concentrically about the carrier 74 and centerline 76, and that is resiliently compressed axially between the collar 105 of the carriage 102 of the indexing apparatus 70 and the side panel 56 of the bracket 30 (i.e. as oppose to the sidewall 48 of the shuttle portion 44 for apparatus 68).

In operation and when the rocker-arm lock device 66 is moved from the locked position 82 and toward the unlocked position 84 the lever 86 of the actuator 72 is moved preferably in direction 88 and the carrier 74 is moved in direction 79 (substantially perpendicular to direction 88), as illustrated in FIG. 5. In another preferred embodiment, however, the lever may be rotated in an imaginary plane that is substantially perpendicular to the centerline 76 of carrier 74 while still moving the carrier 74 in direction 79. During this movement of lever 86, the biasing force of the springs 144 of indexing apparatuses 68, 70 assist in the unlocking movement along centerline 76. Also during movement along direction 79, the rocker arms 116, 118 of indexing apparatuses 68, 70 are biased toward a parallel relationship with the bases 104 of carriages 102. This clears the teeth 134 of the pads 130, 132 from the teeth 96 of the rails 92, 94, 146, 148.

When the locked device 66 is in the unlocked position 84 both the longitudinal and tilt indexing apparatuses 68, 70 are released and the driver is free to adjust the extension and tilt orientation of the steering wheel of the steering column assembly 20 without having to hold on to the lever 86 of the actuator 72. When the assembly 20 moves between the retracted and extended positions 34, 36, the elongated carrier 74 generally remains with the bracket 30 and does not generally move with the shuttle portion 44 of the housing 28. Any such movement of the carrier 74 in a horizontal plane is prevented by the sides 61, 63 of the vertical slots 58, 60 in the bracket 30. However, when the assembly moves between the tilt states 38, 40, the elongated carrier 74 is in motion with respect to the stationary bracket 30 and generally moves with the shuttle portion 44. Lateral movement of the carrier 74 when adjusting the tilt state is then guided by the substantially vertical slots 58, 60.

When the longitudinal position and tilt state are selected by the driver, the lock device 66 of the assembly 20 is then moved toward the locked position 82 preferably by moving the lever 86 in a reverse direction to direction 88 and against the biasing force of the springs 144. Continued movement of the carrier 74 in direction 77 causes the rocker arms 116, 118 of apparatuses 68, 70 to counter rotate against the biasing force of the compression members 140, 142 until one pad 130, 132 of each rocker arm 116, 118 of each apparatus 68, 70 mates to a respective rail 92, 94, 146, 148.

Figure 11:
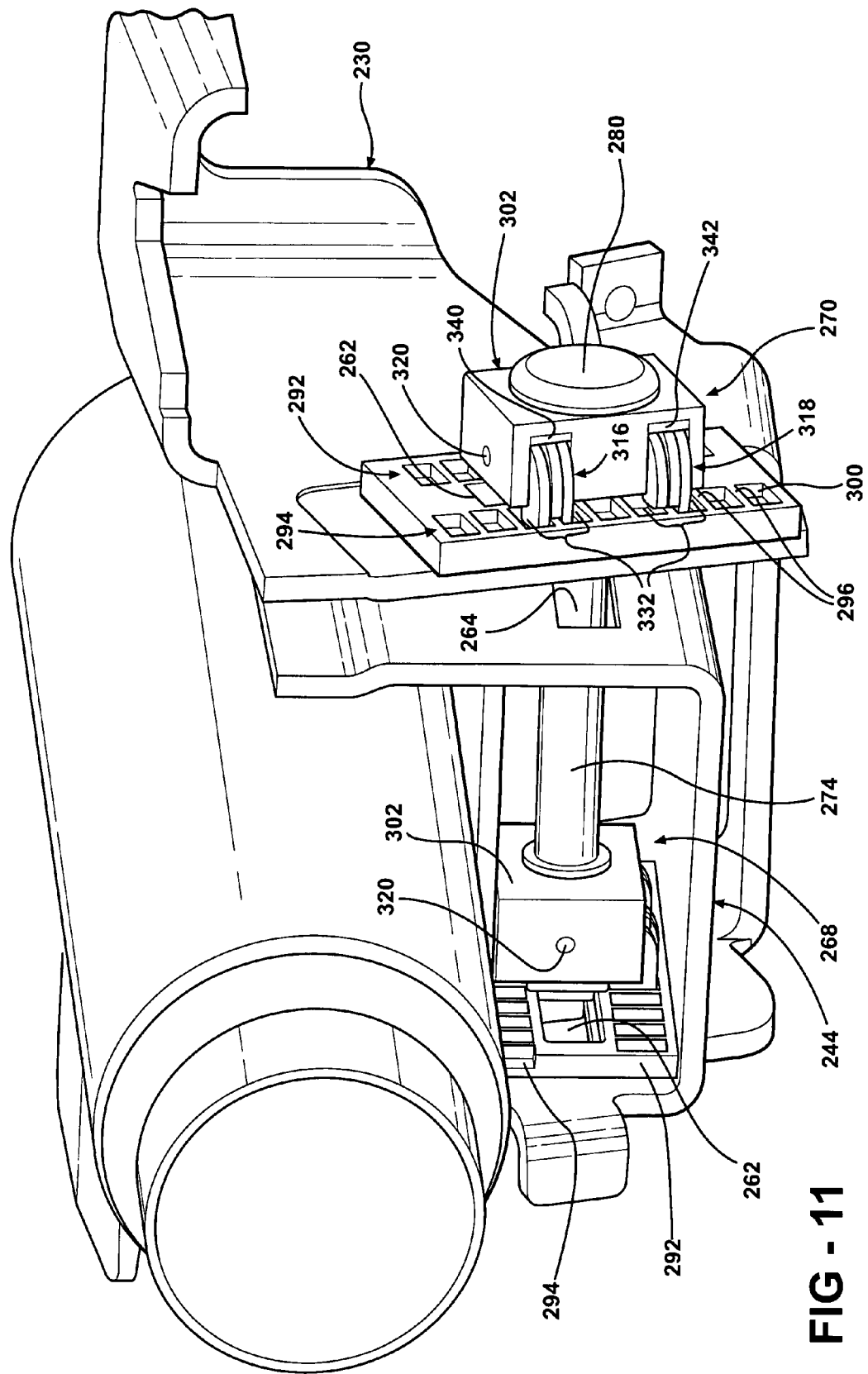
FIG. 11 is a perspective view of a second embodiment of a tilt indexing apparatus of a rocker-arm lock device.
Figure 12:
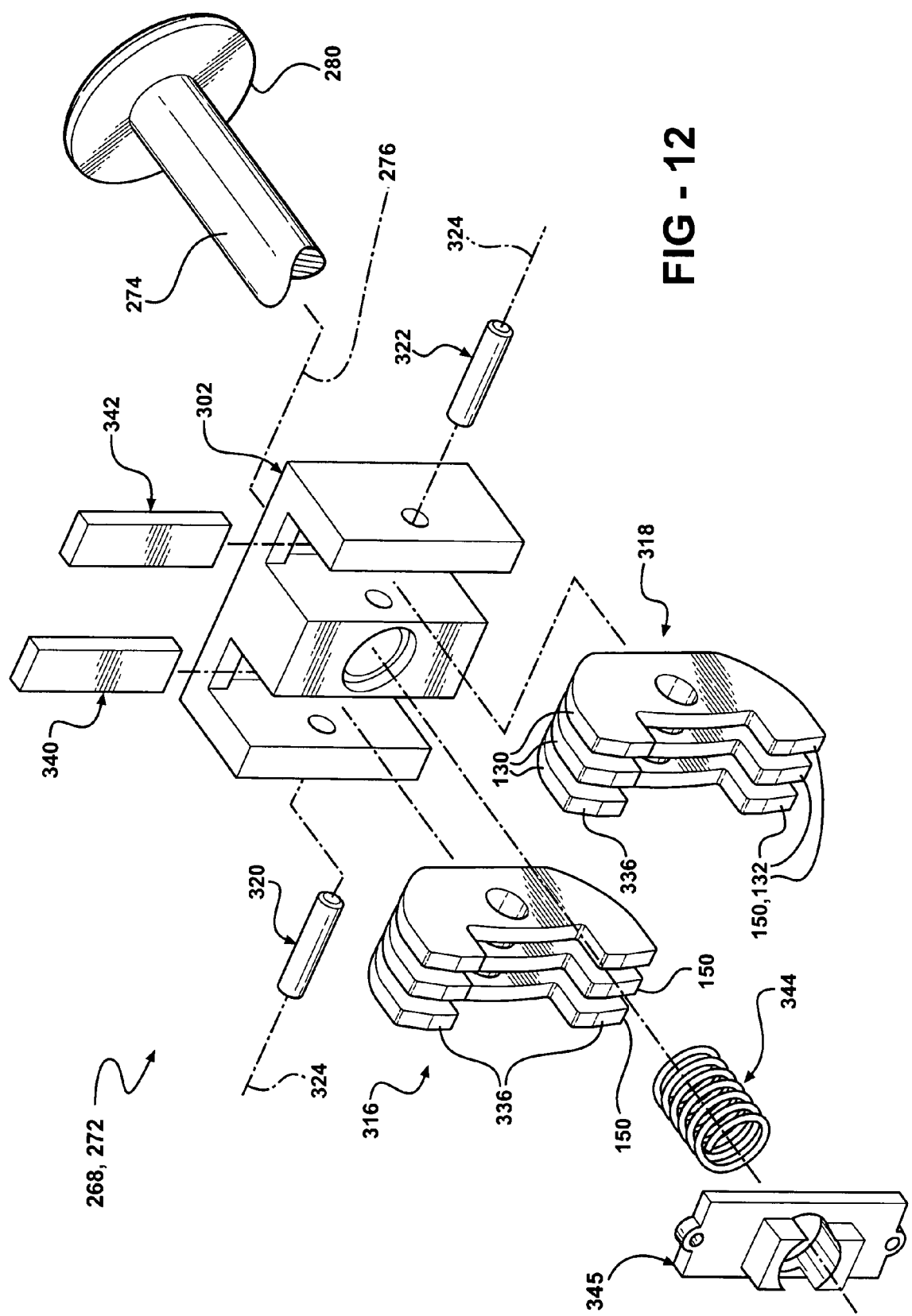
FIG. 12 is an exploded perspective view of the second embodiment of the tilt indexing apparatus.

Referring to FIGS. 11 and 12, a second embodiment of an indexing apparatus 268 is illustrated wherein like elements to the first embodiment of the indexing apparatus 68 has like identifying numerals except with the summed addition of two hundred. Like apparatus 68, apparatus 268 has a carriage 102, rocker arm pins 320, 322, compression members 340, 342, and a spring 344 located concentrically about a carrier 274. Rocker arms 316, 318 of indexing apparatus 268 each have a plurality of rocker sections 150 that rock or pivot independently about an axis 324 and/or respective pins 320, 322. The sections 150 of respective arms 316, 318 together form a pair of dynamic pads 130, 132. The opposite distal ends 336 of each section 150 forms a finger or tooth. The resultant plurality of fingers 336 at any one end of the arms 316, 318 forms the respective dynamic pads 130, 132.

The dynamic pads 130, 132 interact with respective rails 292, 294 located at opposite sides of a slot 262. Each rail 292, 294 has a plurality of teeth or ribs 96 that extend perpendicular to the slot 262 and separated by adjacent valleys or recesses 300. The ribs 96 between rails 292, 294 are offset and the rocker arms 316, 318 are appropriately spaced from one another so that the arms are countered to one another when indexed or mated to the rails 292, 294. As illustrated in FIG. 11, two of three distal ends or fingers 336 of pad 332 of arm 316 are in a recess 300, and only one of the fingers 336 of pad 332 of arm 318 is in a recess 300. Although not illustrated, the opposite distal ends or fingers 336 of sections 150 of respective arms 316, 318 is generally reversed in orientation with the ribs 296 and recesses 300 of rail 292.

While the forms of the invention herein disclosed constitute presently preferred embodiments, many others are possible. It is not intended herein to mention all the possible equivalent forms or ramification of the invention. It is understood that terms used herein are merely descriptive, rather than limiting, and that various changes may be made without departing from the spirit or scope of the invention

What is claimed is:

1. An adjustable steering column assembly for a vehicle comprising:
   a steering shaft rotatable about a rotation axis;
   a co-extending housing journaled to said shaft;
   a bracket engaged operably to said housing;
   a first slot in at least one of said housing and said bracket;
   first and second indexing rails carried by at least one of said housing and said bracket having said first slot;
   a carrier supported slidably by said bracket and extending through said first slot along a centerline transverse to said rotation axis;
   a carriage engaged to said carrier;
   a first rocker arm supported pivotally to said carriage for rocking movement about a rocker axis orientated perpendicular to said centerline, said first rocker arm having a first indexing pad for selective mating with said first indexing rail and a second indexing pad for selective mating with said second indexing rail; and
   wherein the adjustable steering column assembly is in a locked position when at least one of the first and second indexing pads are mated with the respective first and second indexing rails.

2. The adjustable steering column assembly set forth in claim 1 wherein said carrier is constructed and arranged to move in a first direction along said centerline to place said lock device in said locked position and move in an opposite second direction to place said lock device in an unlocked position.

3. The adjustable steering column assembly set forth in claim 2 wherein said rocker axis is disposed substantially parallel to said slot.

4. The adjustable steering column assembly set forth in claim 3 wherein said rocker arm has diametrically opposite first and second legs carrying respective first and second pads facing laterally outward with respect to said rocker arm.

5. The adjustable steering column assembly set forth in claim 1 wherein said first and second indexing rails co-extend at respective opposite sides of said first slot.

6. The adjustable steering column assembly set forth in claim 1 wherein said first slot is located in said housing and is substantially parallel to said rotation axis for longitudinal adjustment of the steering column assembly.

7. The rocker-arm lock device set forth in claim 1 wherein said first slot is located in the bracket and is substantially perpendicular to the rotation axis for tilt adjustment of the steering column assembly, and wherein the housing is supported by said carrier.

8. The adjustable steering column assembly set forth in claim 1 further comprising:
a first indexing apparatus having said carriage and said first rocker arm;
said first slot located in said housing and disposed parallel to said rotation axis for longitudinal adjustment of the steering column assembly;
a second slot located in the bracket and disposed perpendicular to said first slot;
third and fourth indexing rails disposed about said second slot; and
a second indexing apparatus associated with the second slot for tilt adjustment of the steering column assembly.

9. The adjustable steering column assembly set forth in claim 1 further comprising:
said bracket having a first panel and a second panel disposed parallel to and spaced from said first panel;
wherein said first and second rails are carried by said second panel and said first slot is located in said second panel;
said housing being located at least in part between said first and second panels and supported by said carrier; and
said carrier having a first end projecting outward from said first panel and an opposite second end projecting outward from said second panel.

10. The adjustable steering column assembly set forth in claim 9 further comprising:
said first slot disposed substantially vertical;
a substantially vertical second slot in said first panel and located opposite said first slot; and
wherein said carrier extends through said first and second slots.

11. The adjustable steering column assembly set forth in claim 10 further comprising:
a third slot orthogonal to said first and second slots and located in said housing;
a first indexing apparatus having said carriage and said first rocker arm for tilt adjustment of the steering column assembly; and
a second indexing apparatus associated with said third slot for selectable longitudinal adjustment of the steering column assembly.

12. The adjustable steering column assembly set forth in claim 11 further comprising:
first and second walls of the housing disposed inward from and adjacent to respective first and second panels, wherein said third slot is in said first wall;
a fourth slot orthogonal to said first and second slots and located in said second wall; and
wherein said carrier projects through said third and fourth slots.

13. The adjustable steering column assembly set forth in claim 12 further comprising an actuation lever connected to said first end for moving the adjustable steering column assembly between an unlocked position and said locked position, wherein said second end is moved away from said second panel along said centerline when moving toward said locked position, and wherein said second end is moved toward said second panel when moving toward said unlocked position.

14. An adjustable steering column assembly for a vehicle, comprising:
a steering shaft rotatable about a rotation axis;
a bracket;
a housing co-extending with and journaled to said shaft and engaged operably to said bracket; and
a column lock device having a locked position in which relative adjustment between said bracket and housing is prevented, and an unlocked position in which relative adjustment between said bracket and housing is permitted, and comprising:
a carrier;
a carriage engaged to said carrier and having a rocker axis; and
a rocker arm connected pivotally to said carriage about said rocker axis with said rocker arm having diametrically opposite first and second legs carrying respective first and second pads facing laterally outward with respect to said rocker arm for selective engagement with one of said housing and said bracket.

15. The adjustable steering column assembly set forth in claim 14, wherein said carrier extends along a centerline disposed perpendicular to said rocker axis, and said carrier has a first end and an opposite second end, and further comprising an actuation lever connected to said first end for moving said column lock device along said centerline and between its unlocked and locked positions.

16. The adjustable steering column assembly set forth in claim 15, further comprising a spring compressed axially against said carriage and with respect to said centerline, said column lock device being biased toward its unlocked position by said spring.

17. The adjustable steering column assembly set forth in claim 15, further comprising a resiliently compressible member located between said rocker arm and said carriage, said rocker arm being biased into at least one of a parallel orientation with said carriage and a perpendicular orientation with said centerline by said resiliently compressible member, when said column lock device is in its unlocked position.

18. The adjustable steering column assembly set forth in claim 14, wherein said first and second pads each has at least one tooth for selective mating with one of said housing and said bracket, when said column lock device is in its locked position.

19. The adjustable steering column assembly set forth in claim 14, further comprising:
a second rocker arm supported pivotally to said carriage for rocking movement about said rocker axis, said second rocker arm having a third indexing pad for selective mating with one of said housing and said bracket and a fourth indexing pad for selective mating with one of said housing and said bracket, when said column lock device is in its locked position; and
wherein said first and second rocker arms are spaced radially outward from said carrier with respect to said centerline with said carrier extending between said first and second rocker arms.

20. The adjustable steering column assembly set forth in claim 14, wherein said first and second pads each has at least one tooth for selective mating with one of said housing and said bracket when said column lock device is in its locked position, and further comprising a second rocker arm supported pivotally to said carriage for rocking movement about said rocker axis, said second rocker arm having a third indexing pad for selective mating with one of the housing and the bracket and a fourth indexing pad for selective mating with one of the housing and the bracket when said column lock device is in its locked position, said first and second rocker arms being spaced radially outward from said carrier with respect to said centerline with said carrier extending between said first and second rocker arms.

21. The adjustable steering column assembly set forth in claim 20, wherein said tooth of said first and third pads are aligned to said respective tooth of said second and third pads for mating of only one of said first and second pads, and mating of only one of said third and fourth pads to said one of said housing and said bracket, when said column lock device is in its locked position.

22. The adjustable steering column assembly set forth in claim 21, wherein said tooth of said first pad is spaced from said tooth of said second pad by a distance equal to a factor of tooth widths plus a one half width of said tooth, for rocked counter orientation of said first rocker arm with said second rocker arm, when said column lock device is in its locked position.

23. The adjustable steering column assembly set forth in claim 14, wherein said rocker arm has a plurality of sections that rock independently from one another about said rocker axis.

* * * * *